D. M. SMITH.
MOTOR VEHICLE.
APPLICATION FILED JUNE 16, 1913.
1,085,501. Patented Jan. 27, 1914.
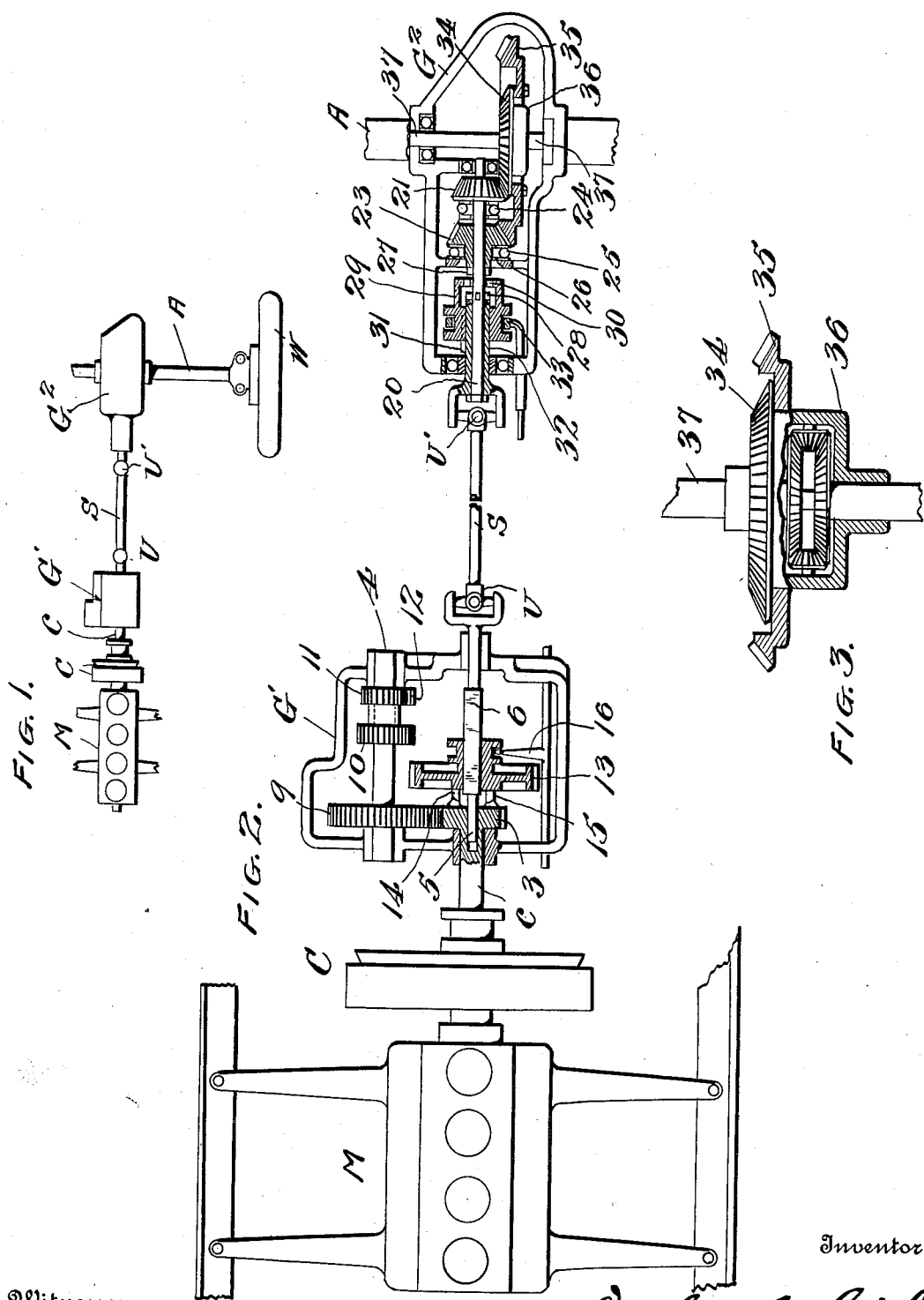

UNITED STATES PATENT OFFICE.

DEMPSTER M. SMITH, OF WASHINGTON, DISTRICT OF COLUMBIA.

MOTOR-VEHICLE.

1,085,501.     Specification of Letters Patent.     Patented Jan. 27, 1914.

Original application filed June 7, 1909, Serial No. 500,770. Divided and this application filed June 16, 1913.
Serial No. 773,983.

*To all whom it may concern:*

Be it known that I, DEMPSTER M. SMITH, a citizen of the United States, residing at Washington, District of Columbia, have invented certain new and useful Improvements in Motor-Vehicles, of which the following is a specification.

My invention relates to novel construction and arrangement of certain of the parts of a motor vehicle, the principal objects being to obtain greater transmission efficiency and better weight distribution.

The characteristics and advantages of the invention will be pointed out sufficiently hereafter in connection with a detailed description of the accompanying drawing, which illustrates one exemplifying embodiment of the invention.

It is to be understood that the invention is capable of embodiment in many different forms.

This application is a division of my previously pending application, Ser. No. 500,770, filed June 7, 1909, for "power system for motor vehicles."

Figure 1 is a diagrammatic plan view of sufficient parts of a motor vehicle to enable my invention to be understood. Fig. 2 is an enlarged partly sectional view showing details of construction of one embodiment. Fig. 3 is an enlarged sectional view, representative of differential mechanism which may be employed.

Referring to Fig. 1, M is a motor carried forward in the chassis frame (F, Fig. 2); $G^1$ is a gear box; C a clutch connecting the motor and gear box; $G^2$ a second gear box on rear axle A, and S is a propeller shaft connecting the gear box $G^1$ and $G^2$ by means of universal joints U and $U^1$.

It has been customary in automobiles to arrange the transmission gearing in a single group located either on the chassis frame or on the rear axle. This frequently results in concentrating too much weight at a single point, especially when the gearing is located on the rear axle. To avoid this objection I locate part of the gearing $G^1$ on the chassis frame and another part $G^2$ on the rear axle, thus distributing the weight more advantageously and especially relieving the rear axle of a large part of the weight, and at the same time I obtain other very important advantages, as will appear.

Gearing $G^1$ may provide for two or more speed combinations and gearing $G^2$ may provide for two or more combinations, and an important characteristic of the invention is that every speed combination of gear $G^1$ may be used in connection with every speed combination of gear $G^2$, and thus a greatly increased number of speeds is obtained with very few parts, the total number of speeds being, in fact, the product obtained by multiplying the number of speed combinations of one set of gearing by the number of speeds of the other.

In a representative embodiment, as shown in Fig. 2, gearing $G^1$ provides two forward combinations and one reverse, while gearing $G^2$ provides two combinations, either forward or reverse, if desired.

Clutch C connects the motor with gearing $G^1$. On the rear end of driven clutch shaft C is spur pinion 3 engaging gear 9 on the countershaft 4. The secondary or driven gear shaft 6 is journaled at the front end in the clutch shaft and at the rear in the gear box, and it has an angular or splined portion 6 engaging sliding gear 13. This gear is provided with positive clutch members 14 coöperating with positive clutch members 15 on pinion 3, and the gear is adapted to coöperate with the gear 10 on the countershaft for forward driving at a low gear ratio and with reverse gears 11, 12, for reverse driving. The sliding member is shifted by shifter rod and arm 16 engaging an annular groove provided on the gear.

When sliding member 13 is in the position shown in Fig. 2, the positive clutch members are engaged and the drive is direct from the motor through clutch C to the driven gear shaft 6. If the sliding member is moved so that gear 13 engages gear 10, the drive is at a reduced ratio from pinion 3 to gear 9, to gear 10, to gear 13, and so to driven shaft 6. If the sliding member is moved so that gear 13 engages reverse pinion 12, the drive is in the reverse direction at reduced speed through the countershaft in an obvious manner. Gearing $G^1$ may be termed for identification "reduction gearing," since its chief purpose is to provide either a direct drive to gearing $G^2$ or a reduction drive, as may be required.

Gearing $G^2$ comprises the usual differential mechanism 36 on the rear axle 37, but instead of a single bevel pinion and gear combination as usually provided, there are two sets of bevel pinions and gears or direct drive members. For this purpose the differential casing 36 carries bevel gear 34 and bevel gear 35. Main shaft 20 of gear $G^2$ carries fixed pinion 21 engaging gear 34 and a loose pinion 23 engaging the gear 35. Rotatably located on the forward end of shaft 20 is a sleeve 32 and this is connected with driven shaft 6 on gear $G^1$ by propeller shaft S and universal joints U, $U^1$. Only one universal joint need be used if desired. Sleeve 32 is made of angular section or splined to slidably engage clutch member 29, which carries positive clutch teeth 30. Pinion 23 has clutch members 27 to engage teeth 30, and shaft 20 has lugs or teeth 28 to engage teeth 30. Suitable radial and thrust bearings are provided for the shaft and pinions. Clutch 29 is shifted by rod 33 and collar engaging an annular groove in said member. Gear $G^2$ thus comprises two direct drive pinions of different speed ratios, either of which may be made effective by moving clutch 29 to engage either pinion 23 or lugs 28 on shaft 20 in order to make pinion 21 effective for driving. At the same time sliding member 13 of gearing $G^1$ may be placed either in direct drive or reduction drive position, and thus four forward speeds are available at the will of the operator. By moving sliding member 13 into engagement with reverse pinion 12 and suitably adjusting clutch 29, reverse drive at two different ratios may be had.

Leaving out of consideration reverse driving, it is evident that by my invention I am able to provide four forward speeds with the employment of only eight gears and one positive clutch, and one combination positive clutch for gearing $G^2$, or ten elements of gearing in all. In ordinary motor vehicles having three forward speeds there are required for the forward speeds alone eight gears and one positive clutch, so that by the provision of one additional clutch device I am able to obtain an additional speed and at the same time to realize the great advantage of two direct drives by means of which the engine can drive the car most of the time in a most efficient way through a single set of gear tooth contacts and without the intervention of reduction gearing, either direct drive combination being used according to road conditions and speed desired. If greater speed reduction is desired, the reduction gearing may be introduced into the driving line and this in turn may be used with either direct drive combination, so that for heavy pulling or slow driving the most advantageous one of two or more reduction gear ratios may be chosen.

It will be evident that more speed combinations may be provided in either gearing $G^1$ or $G^2$, but it will probably usually be most advantageous when more speed combinations are desired to provide them in gearing $G^1$, and this may be done by adding simply another sliding gear on shaft 6 to coöperate with another gear on countershaft 4, or in other ways well understood by those versed in the art.

In addition to obtaining the advantages of multiple-speeds and multiple direct drives, as above described, it is very important that these results are obtained without overloading the rear axle by placing the entire gearing thereon, but instead a major portion of the weight of gearing is carried by the chassis frame and is supported on the axle through springs instead of directly without springs. It is well known that when excessive weight is carried on the rear axle directly, a number of disadvantages follow, such as increased wear of tires, greater strain on bearings, slower driving, due to excessive vibration of the axle on rough roads, etc.

Considering the invention in its broader aspect, gearing $G^1$ is representative of any change speed gearing supported by the chassis frame and providing a direct drive and one or more reduction drives to the propeller shaft; gearing $G^2$ is representative of any direct drive gearing associated with the driving axle and providing at least two selectively operative direct drives of different ratios; and shaft S is representative of any suitable propeller shaft for providing a driving connection between these two sets of gearing suitable to the association of one set with the frame and the other set with the axle. The particular types of gearing and shaft connection shown diagrammatically in the drawing are satisfactory forms and preferable in some cases.

I claim:

1. In a motor vehicle, the combination of a chassis frame, a motor forwardly located thereon, a rear axle, a first set of transmission gearing carried by said axle, a second set of transmission gearing carried by said chassis frame, a shaft and universal joint connecting said first and second sets of gearing, and a clutch intermediate said motor and said second set of gearing.

2. In a motor vehicle, the combination of a chassis frame, a motor thereon, a rear axle, two bevel gears thereon, two bevel pinions engaging said gears and carried on a common axis at right angles to said axle, a propeller shaft, means for operatively connecting said propeller shaft to drive said axle through either of said pinions and its corresponding gear, reduction gearing supported by said chassis frame, a driving member, and means for connecting said propeller shaft with said driving member either directly or through said reduction gearing, as desired.

3. In a motor vehicle, the combination of a chassis frame, a motor thereon, a rear axle, two bevel gears thereon, two bevel pinions engaging said gears and carried on a common axis at right angles to said axle, a propeller shaft, means for operatively connecting said propeller shaft with either of said pinions, a clutch, a pinion connected with the clutch, a countershaft driven by said pinion, a driven shaft, a sliding member thereon, means for engaging said sliding member directly with said pinion for direct driving or with said countershaft for reduced speed driving, and a connection between said driven shaft and said propeller shaft.

4. In a motor vehicle, the combination of a chassis frame, a motor thereon, a drive axle, two pairs of direct-drive gears of different ratios associated with said axle, selective means for making either pair of said gears operative to drive said axle, change-speed gearing on the chassis frame including selectively-operative direct-driving means and reduction driving means; a propeller-shaft intermediate said change-speed gearing and said direct-drive gears, and clutch means intermediate the motor and said change-speed gearing.

5. In a motor vehicle, the combination of a rear axle, gearing thereon providing two selectively operative direct drives, other gearing providing a direct drive connection and one or more reduction drives, and a transmission shaft flexibly connected intermediate said sets of gearing.

6. In a motor vehicle, the combination of a chassis frame, a motor thereon, a clutch, a rear axle, gearing thereon providing two selectively-operative direct-drives, other gearing supported by the chassis frame and providing direct-driving means and one or more indirect drives, and a transmission shaft connected intermediate said sets of gearing.

7. In a motor vehicle, the combination of a chassis frame, a motor thereon, a transverse rear axle, two bevel gears thereon, two bevel pinions engaging said gears and carried on a common axis at right angles to said axle, a propeller shaft, means for operatively connecting the propeller shaft with either of said pinions, as desired, gearing supported on the chassis frame at the forward end of said propeller shaft, said gearing comprising a driving member, a driven shaft connected with said propeller shaft, means for connecting said driving member and driven shaft directly, and reduction gearing for connecting said driving member with said driven shaft indirectly.

DEMPSTER M. SMITH.

Witnesses:
M. A. WOOD,
W. B. BROCK.